(12) United States Patent
Stolze et al.

(10) Patent No.: US 11,349,995 B2
(45) Date of Patent: May 31, 2022

(54) METHOD FOR PROVIDING INTERNET ACCESS TO A CUSTOMER OF A SERVICE PROVIDER AND COMPUTER PROGRAM

(71) Applicant: VOLKSWAGEN AKTIENGESELLSCHAFT, Wolfsburg (DE)

(72) Inventors: Jan Benedikt Stolze, Dormagen (DE); Thorsten Hehn, Ingolstadt (DE); Gregor Stock, Wolfsburg (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/353,032

(22) Filed: Mar. 14, 2019

(65) Prior Publication Data

US 2019/0289135 A1     Sep. 19, 2019

(30) Foreign Application Priority Data

Mar. 19, 2018 (DE) ...................... 10 2018 204 181.4

(51) Int. Cl.
| | |
|---|---|
| *H04M 15/00* | (2006.01) |
| *H04W 4/48* | (2018.01) |
| *G06Q 30/02* | (2012.01) |

(52) U.S. Cl.
CPC ........ *H04M 15/09* (2013.01); *G06Q 30/0205* (2013.01); *H04M 15/51* (2013.01); *H04M 15/755* (2013.01); *H04W 4/48* (2018.02)

(58) Field of Classification Search
CPC .... H04M 15/09; H04M 15/51; H04M 15/755; H04M 1/6041; H04M 1/6075;

(Continued)

(56) References Cited

U.S. PATENT DOCUMENTS

| | | |
|---|---|---|
| 9,060,123 B1 | 6/2015 | Daniel |
| 9,807,547 B1 | 10/2017 | Oesterling et al. |

(Continued)

FOREIGN PATENT DOCUMENTS

| | | |
|---|---|---|
| DE | 102011109720 A1 | 2/2013 |
| FR | 2938719 A1 | 5/2010 |
| WO | 2015106798 A1 | 7/2015 |

OTHER PUBLICATIONS

Office Action for Korean Patent Application No. 10-2019-0030558; dated Jan. 15, 2020.

(Continued)

*Primary Examiner* — Quoc Thai N Vu
(74) *Attorney, Agent, or Firm* — Barnes & Thornburg, LLP

(57) ABSTRACT

A method for providing Internet access to a customer of a service provider wherein the service provider takes over the costs for the customer's Internet use. The method includes the customer's user equipment generating a service start notification message to a server of the service provider in response to the customer agreeing to the service and commencement of use of the service. The service start notification message triggers sending a query to a database of the service provider containing customer data, and confirming the customer has access rights for getting Internet access at the service provider's expenses. The service provider generates and sends out a request message to the mobile communication provider of the customer and requests an intermediate change of the customer's mobile communication contract so the costs for loading Internet data on the customer's user equipment will be temporarily charged to the service provider rather than the customer.

17 Claims, 2 Drawing Sheets

(58) Field of Classification Search
CPC ............ H04M 1/6083; H04M 1/6091; H04M 1/7253; H04M 1/6066; H04M 2250/02; H04M 2250/60; H04W 4/48; H04W 88/10; H04W 4/008; H04W 28/14; H04W 76/02; H04W 88/04; H04W 88/06; H04W 8/18; H04W 8/20; H04W 8/205; H04W 92/18; H04W 4/024; H04W 4/029; H04W 4/14; H04W 4/24; H04W 4/44; H04L 12/1492; H04L 12/1496; H04L 41/5077; H04L 63/10; H04L 67/16; H04L 67/18; H04L 41/5064

See application file for complete search history.

(56) References Cited

U.S. PATENT DOCUMENTS

| | | | | |
|---|---|---|---|---|
| 2003/0096641 | A1* | 5/2003 | Odinak | H04M 1/6075 |
| | | | | 455/569.2 |
| 2003/0157975 | A1 | 8/2003 | Kadel et al. | |
| 2005/0020243 | A1* | 1/2005 | Benco | H04W 8/18 |
| | | | | 455/406 |
| 2011/0258303 | A1 | 10/2011 | Nath et al. | |
| 2012/0142367 | A1* | 6/2012 | Przybylski | H04W 4/046 |
| | | | | 455/456.1 |
| 2013/0103779 | A1 | 4/2013 | Bai et al. | |
| 2013/0130643 | A1 | 5/2013 | Bacareza et al. | |
| 2013/0144460 | A1 | 6/2013 | Ricci | |
| 2014/0073291 | A1* | 3/2014 | Hildner | H04L 41/0806 |
| | | | | 455/411 |
| 2015/0356534 | A1* | 12/2015 | Yan | H04M 15/8083 |
| | | | | 705/40 |
| 2016/0071082 | A1 | 3/2016 | Driscoll et al. | |
| 2016/0126995 | A1* | 5/2016 | Li | H04W 76/10 |
| | | | | 455/558 |
| 2016/0261499 | A1 | 9/2016 | Roy | |
| 2016/0337858 | A1 | 11/2016 | Weidenfeller et al. | |
| 2017/0178269 | A1 | 6/2017 | McKinnon et al. | |
| 2017/0272935 | A1* | 9/2017 | Lei | H04B 1/3816 |
| 2017/0365030 | A1 | 12/2017 | Shoham et al. | |

OTHER PUBLICATIONS

Office Action for European Patent Application No. 19152815.7; dated Apr. 15, 2019.

* cited by examiner

METHOD FOR PROVIDING INTERNET ACCESS TO A CUSTOMER OF A SERVICE PROVIDER AND COMPUTER PROGRAM

PRIORITY CLAIM

This patent application claims priority to German Patent Application No. 10 2018 204 181.4, filed 19 Mar. 2018, the disclosure of which is incorporated herein by reference in its entirety.

SUMMARY

The disclosure relates to a method for providing Internet access to a customer of a service provider, and a corresponding computer program.

BRIEF DESCRIPTION OF THE DRAWINGS

An exemplary embodiment is illustrated in the drawings and is explained in more detail below with reference to the figures.

In the drawings the different figures show.

DETAILED DESCRIPTION

Figure 1:
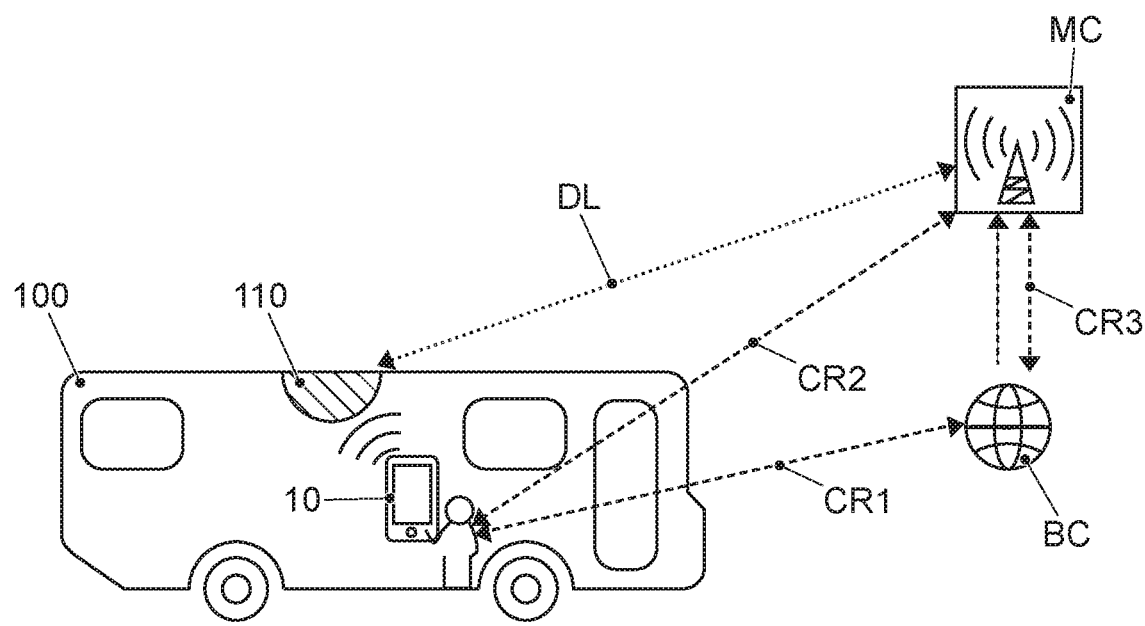
FIG. 1 shows the typical offering of a mobile Internet service to a customer travelling in a bus.

The proposal relates to a cutting-edge service that delivers superior customer value. While the main service of the service provider is one of transportation, selling or buying of products, an event, renting a room, transportation vehicle, or the like, the service provider, to attract the customer, also offers the additional service of offering Internet access free of charge for its customers while they are making use of their service.

One prominent example of such a service is a ridesharing service, sometimes called real-time ridesharing service. This is a service that arranges one-time shared rides for travelling from point A to destination B on very short notice. A modern ridesharing service is coordinated through a network service, which can instantaneously handle the driver payments and match rides using an optimization algorithm. In existing mobility services offered by transportation companies like railway companies, bus companies or airlines, there exist some "free WIFI" offerings in some trains (e.g., on the German ICE trains of Deutsche Bahn company) and some long haul busses (e.g., busses of the Flixbus company).

For ridesharing services no such similar offerings have been found so far. Furthermore, under the assumption that, particularly for the price-sensitive customer group of ridesharing users, the lack of mobile high-speed Internet credit at the end of the month is a tremendous customer pain, in general, but especially during a ridesharing experience with a large amount of spare time during travelling it is believed that the offering of Internet access free of charge to the customers of the ridesharing service would attract potential ridesharing users pretty much.

From DE 10 2011 109 720 A1 a car sharing service is known that is managed via an Internet portal. On the Internet portal a plurality of services is offered among which there is a booking service, a navigation service, a user profile service, a communication service, an accounting service and an authentication service.

From U.S. Pat. No. 9,060,123 B1 a system and method for using WIFI inside a moving vehicle is known. The solution focuses on distinguishing between the driver and the passengers accessing the WIFI network in the vehicle such that the much needed WIFI access does not violate road safety rules.

In U.S. Pat. No. 9,807,547 B1 a vehicle-share relationship management system is presented. This is suitable for vehicle ride sharing services and self-serve vehicle rental services.

A system and method for personal device sharing using social networks is known from US 2011/0258303 A1.

From US 2013/0144460 A1 a method and system for a complete vehicle ecosystem is known, where the passengers inside the vehicle can surf the Internet with their own user portable devices.

From US 2016/0071082 A1 a system and method for automated splitting of costs incurred during a shared vehicle travel. A plurality of users may utilize a vehicle to travel a route such as a ride sharing program between the plurality of users.

In view of the prior art mentioned above, there is still a problem in connection with a cutting-edge ridesharing service: While it is possible to observe "free WIFI" offerings in some trains (e.g., German ICE) and some long haul busses (e.g., Flixbus) implemented with the help of communication-modules providing WLAN access, similar offerings among ridesharing services and other services have not been found. Furthermore, there is a need for improvement under the assumption that, particularly for the price-sensitive customer group of ridesharing users, the lack of mobile high-speed Internet at the end of the month is a tremendous customer pain, in general, but especially during a ridesharing experience (large amount of spare time).

There is, therefore, a need for improving the ridesharing service to increase connectivity for ride sharing users. There is a problem how to make it possible with technical methods or mechanisms that a ridesharing user who signed an agreement with a mobile network operator about Internet usage, and another agreement with a ridesharing service provider when travelling in another person's car, could use the Internet access service provided by the car owners mobile network operator without being charged by his own mobile network provider.

Disclosed embodiments provide a method for providing Internet access to a customer of a service provider and a computer program.

The solution involves the following method operations: First, the customer makes use of the app installed on his mobile device for the service he wants to use. The app is performing a checking operation to determine if the service for the customer is started. If yes, it generates and sends out a service start notification message to a server from the service provider. The server from the service provider receiving the service start notification message in consequence is sending out a query to a data base containing customer data of the service provider. There, it is checked if the customer is entitled for getting Internet access at the service provider's expenses, and if yes, the service provider generates and sends out a corresponding request message to the mobile communication provider of the customer and requests an intermediate change of the customer's mobile communication contract such that the costs for loading Internet data on the customers user equipment will be temporarily charged to the service provider instead of charging it to the customer. The intermediate change of the contract will be recorded in the customer data base of the mobile communication provider.

This form of Internet access provision has certain benefits. On one hand it is believed that it really attracts customers to use this service. On the other hand it makes it possible that the service provider does not need to install expensive communication modules with WLAN module to provide Internet access to their customers.

In this solution, the customer may be queried beforehand whether he agrees to a temporary change of his mobile communication contract. This way the need to query this for each single use of a service becomes obsolete.

For getting Internet access in at least one disclosed embodiment, it is beneficial that the customer's user equipment is performing a position tracking operation and the service start notification message is generated when, in the position tracking operation, it is recognized that the customer reaches the location where the service will be provided. The position tracking operation can be performed with the help of a satellite navigation system such as GPS, GLONASS, Galilei, or Beidou.

It is beneficial that the request message to the mobile communication provider (MC) of the customer includes one or more of the information items customer phone number, customer contract information, data access conditions, such as the amount of covered data or time span in which data loading at the expense of the service provider (BC, RC) is covered and the speed at which data loading is covered.

In the proposed method, it is beneficial that the operation of checking if the customer has access rights for getting Internet access at the service provider's expense includes an operation of authentication of the customer.

Here, it is one proposal that the authentication operation of the customer includes the checking of login data the customer has entered. This enables the service provider to identify the device of a customer and through an "unlock" procedure of the device, they would even be able to authenticate that a particular customer is present. This allows for two very important facets:

It prevents customers to dodge the provision on the service platform—as still happening often among users of, e.g., a ridesharing service, where private agreements circumvent the provision payment on the app Insurances commonly do not issue a contract to a device, especially not on demand, hence, we would be able to unambiguously identify our customer and channel relevant partner services on the device.

Also it is a beneficial measure, that the mobile communication provider generates and sends out a first confirmation message to the customer to inform him that his mobile communication contract has been changed.

Once the customer has ended the use of the service, it is beneficial when the service provider generates and sends out a request message to the mobile communication provider of the customer for ending the intermediate change of the customer's mobile communication contract if the customer has stopped the service.

Again it is beneficial, that the change back of the communication contract to personal contract conditions is recorded in the mobile communication provider's data base when the use of the service is over and that the mobile communication provider generates and sends out a second confirmation message to the customer to inform him that his mobile communication contract has been changed back to the previous contract conditions.

In a further disclosed embodiment, if the first and second confirmation is generated and sent out as one of an SMS message corresponding to the Short Message Service, EMMS message corresponding to Enhanced Message Service and MMS message corresponding to Multimedia Messaging Service. These message services are pretty reliable and all the smart phones will be able to receive such messages and the customer gets a clear hint that the message has been received.

In a disclosed embodiment, the user equipment device of the customer comprises one of a smart phone, tablet computer or notebook or laptop computer.

For the user equipment to be used in the proposed solution it is beneficial to include a mobile communication module which is capable to perform mobile communication according to one of the systems LTE corresponding to Long Term Evolution or 5G corresponding to the 5. Generation mobile communication technology.

As explained in the introductory portion of the application the solution could be used for a great variety of service providers. Examples of service providers are one of a ridesharing service provider, a hotel service provider, a supermarket service provider, or warehouse service provider, a repair shop service provider, a public viewing service provider, or a transporting service provider such as railway service provider, airline service provider or rental car service provider.

For the disclosed embodiment that the service provider is a ridesharing service provider, the fact that it becomes obsolete to install expensive communication modules with WLAN module to provide Internet access to the customers of a ridesharing service is more than valid for the owners of private cars participating in a ridesharing service. Moreover, it has the benefit for ridesharing service providers that they will be enabled to better authenticate their customers and verify if the customer is present in the car for which he booked a ride. Customers can surf at a defined max. speed of, e.g., 1 Mbit/s throughout the ridesharing service without data limit.

Moreover, for the case the service provider is a ridesharing service provider, it is beneficial that the ridesharing service provider tracks the movement of the customer, wherein it will be verified if the customer is travelling along a booked route of the ridesharing service, and wherein charging of the costs to the ridesharing service provider for loading Internet data continues as long as the customer is travelling along the booked route. On the other hand, it is beneficial for the ridesharing service provider that free Internet access will be stopped when the customer stops the route or takes a different route.

The proposal also concerns a corresponding computer program which is adapted to perform the operations of the customer's user equipment device in the proposed method. This program may be designed in the typical form of a mobile phone application program which could be downloaded from an app store and installed on the mobile phone.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, properties, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a method or mechanism for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited method or mechanism are combined and brought together in the manner which the claims call for. It is thus regarded that any method or mechanism that can provide those functionalities are equivalent to those shown herein.

FIG. 1 shows a bus 100 which belongs to a transportation company like MeinFernbus-Flixbus, Euroline, Ouibus, Polskibus and so on. These transportation companies sometimes offer free WiFi to their customers travelling in their busses. For this purpose the bus 100 is equipped with an on-board communication module 110. This on-board communication module 110 includes a WLAN module and an LTE modem. The WLAN module provides wireless communication to the user equipment devices of customers travelling in the bus. The LTE modem serves as a transmitting and receiving unit for communication in a mobile radio network more particularly via the LTE mobile communication technology. All the data that will be downloaded from Internet from the user equipment devices 10 of the passengers in the bus 100 will be delivered by the LTE modem.

The FIG. 1 also shows the contract relationships between the customer in the bus and the mobile communication provider MC of the customer and the transportation company BC. There are three contract relationships shown: CR1 between the customer and the transportation company, CR2 between the customer and the mobile communication provider MC, and CR3 between the transportation company BC and the mobile communication provider MC. The customer has a contract CR2 with the mobile communication provider MC for making telephone calls, sending messages such as SMS (Short Message Service), EMS (Enhanced Messaging Service) and MMS (Multimedia Messaging Service) and for downloading and uploading data from and to Internet. The customer may choose from different tariffs of a single mobile communication provider or a plurality of mobile communication providers. The tariffs may differ in various contract details such as data volume, data speed, message volume, telephone call costs, country coverage, and the like. The customer also does have a contract CR1 with the transportation company which usually is signed when the customer accepts the terms and conditions when logging to the free WIFI service offered by the transportation company BC. The transportation company BC has signed a contract with a mobile communication provider MC for offering the free WIFI service to their customers. The mobile communication provider to which the transportation company has signed-up may be a different mobile communication provider than the mobile communication provider to which the customer in the bus 100 has signed-up.

All messages from the bus 100 (uplink) and to the bus 100 (downlink) are routed either via a base station which serves a mobile radio cell. If the bus 100 is within this mobile radio cell, it is registered or logged in at the base station. If it leaves the mobile cell, it will be handed over to the neighboring cell (handover) and accordingly logged out or logged off at the present base station.

Such mobile radio technologies are standardized and reference is made here to the corresponding specifications of mobile radio standards. As a modern example of a mobile radio standard, reference is made to the 3GPP initiative and the LTE standard (Long Term Evolution). Many of the related ETSI specifications are currently available in the version 14. The following is mentioned as an example: ETSI TS 136 213 V13.0.0 (2016-05); Evolved Universal Terrestrial Radio Access (E-UTRA); Physical layer procedures (3GPP TS 36.213 version 13.0.0 Release 13).

Data that the LTE modem inside the on-board communication module 110 has downloaded from Internet will be distributed to the user equipment devices 10 via WLAN communication. The WLAN module in the on-board communication module 110, therefore, is compliant with one or a plurality of the various WLAN standards. The WLAN standard family is standardized in IEEE 802.11xy variants. The communication in upstream direction is also possible, where the user equipment device 10 delivers data to the WLAN module which then shifts it to the LTE modem from where it will be uploaded to its destination in the Internet.

Figure 2:
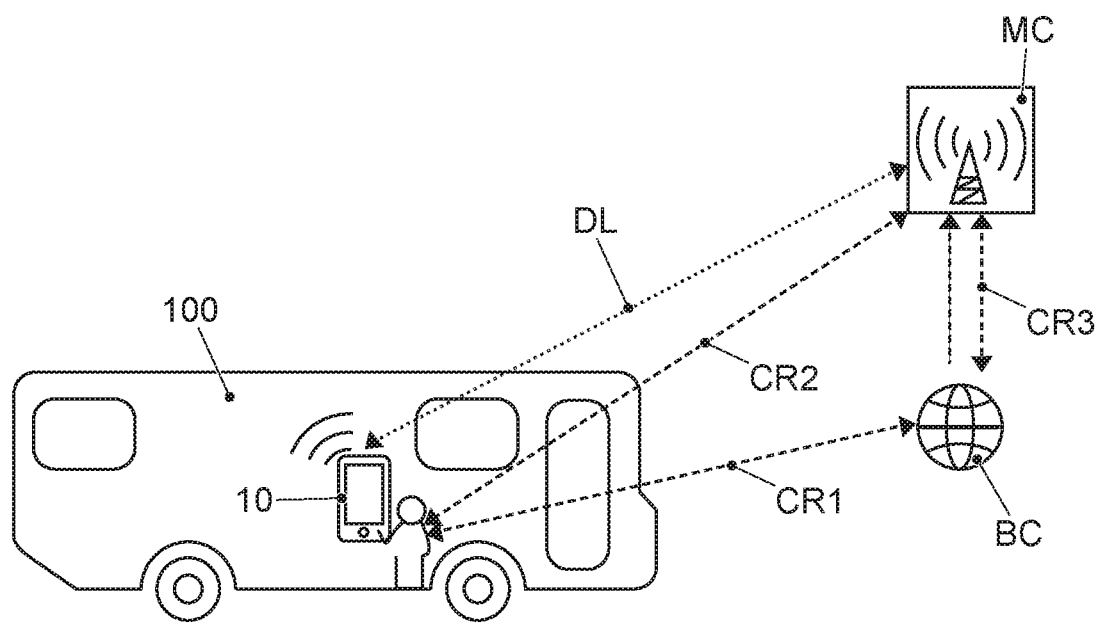
FIG. 2 shows a more sophisticated offering of a mobile Internet service to a ridesharing customer travelling in a bus.

FIG. 2 now shows the structure of an improved system for providing Internet access to customers of a ridesharing service provider, also called real-time ridesharing service. A ridesharing service is a service that arranges one-time shared rides on very short notice. The following components are involved to create a ridesharing system:

GPS navigation to determine a driver's route and arrange the shared ride

Smartphones for a traveler to request a ride from wherever they happen to be

Social networks to establish trust and accountability between drivers and passengers These elements are coordinated through a network service, which can instantaneously handle the driver payments and match rides using an optimization algorithm.

The ridesharing customer closes a contract with the ridesharing service provider each time he wants to make a ride. Therefore, only the single ride will be booked and it means that there is a navigation route proposed to the customer which then will be accepted by the customer once he books the ride. It's a characteristic of the ridesharing services, that the ridesharing service provider may not own a fleet of transportation vehicles like a taxi company. Instead, any car of a private person may be used if such person has agreed to participate in the ridesharing service. The driver/owner of the car will be paid for his service to transport a person. In another example a transportation company owning a fleet of cars, could also offer a similar service. An example is a bus company BC as mentioned in the connection of the description of FIG. 1.

In FIG. 2 this sort of example with a bus company BC offering transportation service is shown. Equal reference signs mark the same components as explained in connection with FIG. 1. The main difference to FIG. 1 is that the bus 100 is not equipped with the on-board communication module 110. The offering of free Internet access for the customers travelling in the bus 100 is nevertheless possible. It is assumed that there is a brilliant coverage of the radio stations of the mobile communication provider MC along the roads where the bus company BC is offering rides. Then the customer can get Internet access with his smart phone 10, directly.

Figure 3:
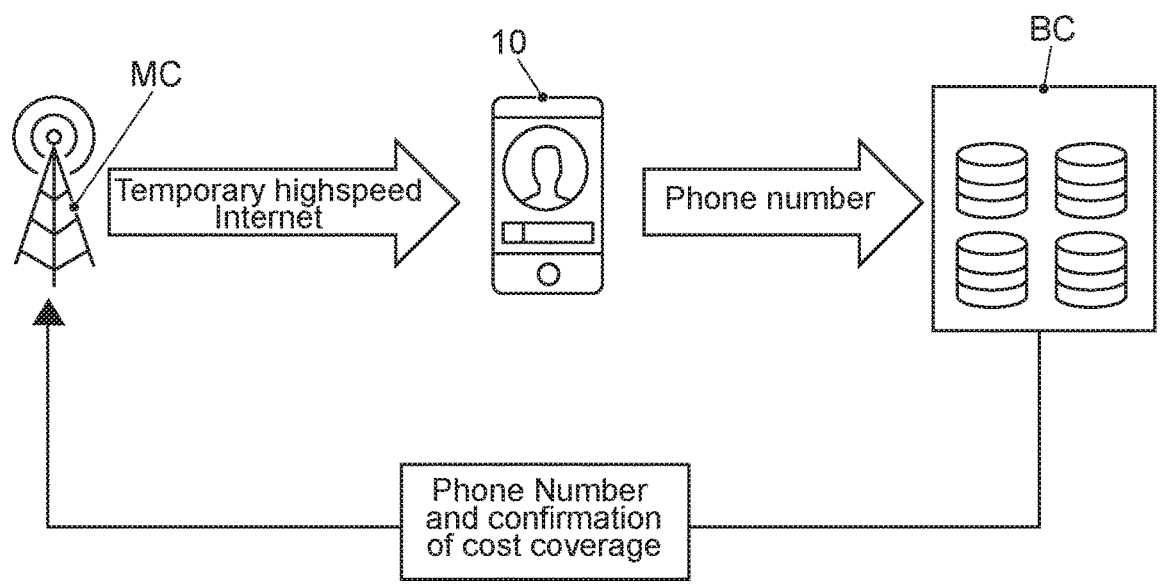
FIG. 3 shows the principle flow of information for the example with the ridesharing customer.

FIG. 3 shows the basic exchange of data between mobile communication provider MC, smart phone 10 and the transportation company, here bus company BC. The mobile communication provider MC is delivering the data for high-speed Internet access to the customer's phone 10, directly. Before such data access is granted, the customer needs to identify himself. For this purpose he provides his phone number to the bus company BC. In addition to the phone number it may be provided a unique phone identification number. Such number is called International Mobile Equipment Identity (IMEI) in the GSM, UMTS and LTE standard. The IMEI is only used for identifying the device and has no permanent or semi-permanent relation to the subscriber. The subscriber is identified by transmission of an International mobile subscriber identity (IMSI) number, which is stored on a SIM card that can in theory be transferred to any handset. That's why the IMSI may also be transferred to the service backend of the bus company BC for identification. This information will be stored in a customer data base of the backend as shown in FIG. 3. For providing free Internet access to the customers, the backend will reach out to the mobile communication provider MC of the customer and provide phone number and confirmation of cost coverage for this customer during the booked ride. Of course, this requires an intermediate modification of the contract the customer has agreed to from the mobile communication provider MC. How this process works will now be explained in greater detail in connection with FIG. 4.

As a further example in FIG. 3 it is considered that the customer is now a customer of a ridesharing service provider RC instead of the bus company BC. There is no principle difference between these two exemplary embodiments. Of course, the customer is travelling in a private car owned by some private person not in a bus from a bus company BC.

On the user equipment 10 there is installed an application program for participating in the ridesharing service. The app has been downloaded from an app store in the usual manner beforehand. This application program comprises computer executable instructions, which may be a computer program, the program being composed in any suitable programming language or source code, such as C++, C, Python, JAVA, JavaScript, HTML, XML, PHP, CSS and other programming languages.

When starting the app for the first time, the customer is queried to enter a plurality of personal data, among that his phone number, name, address, age, etc. In a settings menu the customer can configure the app with his personal settings. Here, with one button, he may agree to a feature that the service provider reaches out to the mobile communication provider of the customer to intermediately change the customer's contract for getting free Internet from the service provider.

Figure 4:
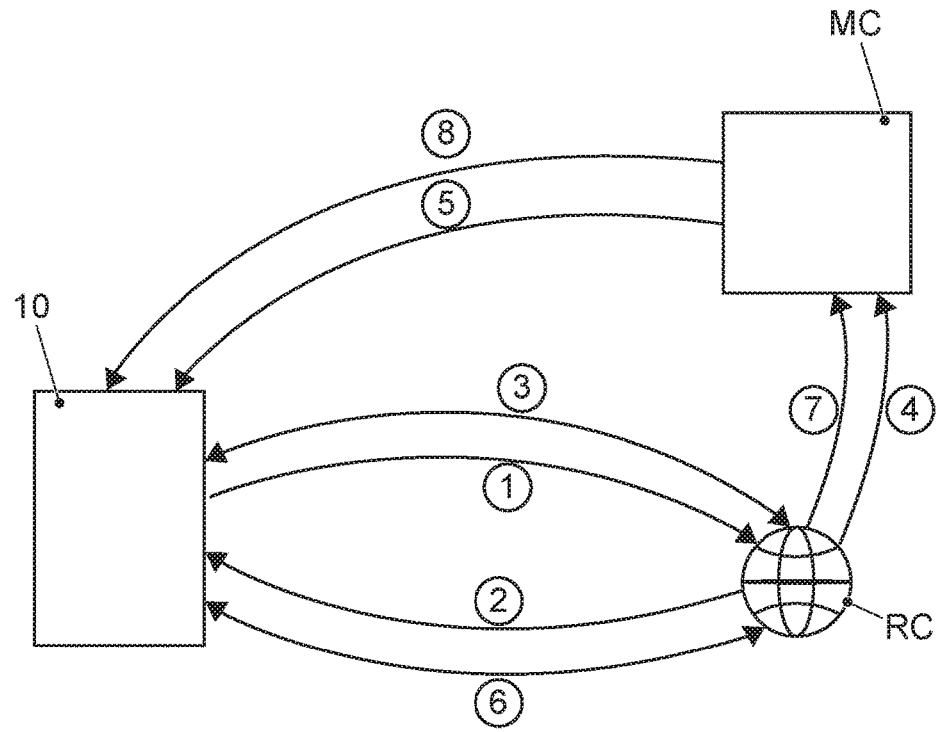
FIG. 4 shows an illustration of the detailed exchange of information between the customer's user equipment, the ridesharing service provider, and the customer's mobile communication provider.

The exchange of information between user equipment 10, mobile communication provider MC and ridesharing service provider RC is depicted in FIG. 4 stepwise. The ridesharing app will perform a position tracking operation once the customer has made agreement for a ride he wants to make. Normally, the agreement also includes the place where the ride shall start, in other words the meeting point and the time when the ride shall start. Of course, also the destination point for the ride is part of the agreement. The position tracking operation for the customer will be started shortly before the time the ride shall start. Once the app finds with position tracking that the customer has arrived at the meeting place, and optionally that he is now moving on the booked navigation route, it recognizes the start of the ride. In an alternative disclosed embodiment it will check the position of the customer and the position of the driver who is offering the ride or the car before recognizing the start of the ride. In an alternative disclosed embodiment the customer will manually enter in the app that the ride starts.

In operation at 1 the user equipment device 10, once the ride has been started, generates and sends out a service start notification message to a server of the ridesharing service provider RC. This request will be generated as a HTTP GET request which includes the URL (Uniform Resource Locator) of the ridesharing service provider's landing page for this purpose. The webserver where the landing page is hosted generates a HTTP Response message in operation at 2 with the web page for the Login user menu. The customer needs to enter login data for the purpose of authentication. He may be requested to enter user name and password of the ridesharing service. In an alternative disclosed embodiment he may be requested to use his Facebook login information or the login information of any other social media network or just an E-Mail login information. The HTTPS protocol may be used for this type of communication. The customer enters login data in operation at 3 and the ridesharing service provider RC checks the login data in the customer data base and acknowledges login to the ridesharing service also in operation at 3. The server where the landing page is hosted may be located at a different place than the customer data base, there is, therefore, also a secure communication going on between web server and backend data base, e.g., also with HTTPS protocol. The user equipment device 10 is hereby authenticated. Operation at 4 then concerns the request generated by the ridesharing service provider's backend directed to the mobile communication provider MC of the customer, which was identified with phone number, IMSI and IMEI. Also this communication may be performed according to the HTTPS protocol.

This request is subject to agreement by the customer. However, the customer will not be queried at this operation to give his approval. In this disclosed embodiment, the customer agrees to this beforehand (see explanation above) by switching this feature on in the app of the ridesharing service provider RC. A corresponding button will be presented in a user menu where the customer may switch on this feature. Optionally the customer may also agree to this feature in an app of the mobile communication provider beforehand. With the request message sent in operation at 4, the ridesharing service provider RC requests an intermediate modification of the customers contract with the mobile communication provider MC. The request message contains the following information items:

Phone number
Contract information
    Confirmation of cost coverage (ridesharing service provider covers the cost)
    Conditions:
        The amount of covered data or the time span in which the data is covered
        The speed at which the data is provided For this operation, certain entries in the customer data base of the mobile phone communication provider MC need to be changed. In addition, the ridesharing service provider is able to identify the user equipment device of the customer and through an "unlock" procedure of the device, they would even be able to authenticate that a particular customer is present in the car. This allows for two very important facets:

Disables passengers to dodge the provision on the ridesharing platform—as still happening often among users of ridesharing platforms, where private agreements circumvent the provision payment on the app.

Insurances commonly do not issue a contract to a device, especially not on demand, hence, the ridesharing service provider would be able to unambiguously identify the customer and channel relevant partner services on the device.

An example of a table with such entries is provided below in Table 1.

TABLE 1

| IMEI | IMSI | Phone No.: | Account Details: | Tariff Type | Data Volume | Data Rate in Mbit/s | Service Provider Account Details | Customer Name | Customer Address |
|---|---|---|---|---|---|---|---|---|---|
| | | 0162xx | | Personal | 375 MB | >10 | | | |

Table 1 shows the entries before the ridesharing service provider requests intermediate change of the customer's contract. Here, the tariff type is set to "Personal" meaning that all costs will be borne by the customer based on his own account details. It is noted that the current entry for the remaining data volume is equal to 375 MB and that the customer is entitled to be supplied with high-speed Internet access in the range of 10 Mbit/s or higher.

Table 2 shows the entries after the ridesharing service provider RC has requested the intermediate change. Here, the tariff type is set to "Sponsor" meaning that all costs will be borne by the ridesharing service provider RC based on the account details of the ridesharing service provider. It is noted that the current entry for the remaining data volume is equal to 375 MB and that the customer is entitled to be supplied with high-speed Internet access in the range of 10 Mbit/s or higher.

TABLE 2

| IMEI | IMSI | Phone No.: | Account Details: | Tariff Type | Data Volume | Data Rate in Mbit/s | Service Provider Account Details | Customer Name | Customer Address |
|---|---|---|---|---|---|---|---|---|---|
| | | 0162xx | | Sponsor | 375 MB | <1 | | | |

The customer will be informed about the change in the contract details once it happens. For this purpose a corresponding SMS message is delivered to the customer's phone in operation at 5. During the ride the customer can enjoy Internet access free of charge sponsored by the ridesharing service provider RC. During that time the ridesharing service provider will monitor if the customer is continuously entitled to get free access. This is done by exchanging information between user equipment 10 and ridesharing provider RC in operation at 6. When the user equipment is a smart phone, it will for sure be equipped with a GPS module for receiving and evaluating the satellite signals of the Global Positioning System. So, what the ridesharing provider does corresponds to a form of GPS tracking. Other satellite navigation systems may be used instead, such as Galileo, GLONASS, or Beidou. The ridesharing provider RC thus can check if the customer is taking the route he has booked. If not, i.e., if he stopped the route or interrupted, then free Internet access will be ended. Then the ridesharing provider RC informs the mobile communication provider MC in operation at 7 and the entries for the contract details will be changed back to the personal tariff type. The customer will receive another SMS in operation at 8 with which he will be informed that the free Internet access has come to an end. The same happens when the ridesharing customer arrives at the destination of the booked route.

Table 3 shows the entries after the free Internet access has come to an end and the ridesharing service provider RC has requested the change back to the personal tariff type.

TABLE 3

| IMEI | IMSI | Phone No.: | Account Details: | Tariff Type | Data Volume | Data Rate in Mbit/s | Service Provider Account Details | Customer Name | Customer Address |
|---|---|---|---|---|---|---|---|---|---|
| | | 0162xx | | Personal | 375 MB | >10 | | | |

There are plenty of services in which the solution could be used for a great variety of service providers. Examples of service providers are one of a ridesharing service provider, a hotel service provider, a supermarket service provider, or warehouse service provider, a repair shop service provider, a public viewing service provider, or a transporting service provider such as railway service provider, airline service provider or rental car service provider.

The solution could also be used for certain service providers organizing events. In concrete, it means that this service could be offered for certain time periods. Examples are if a person books vacation with a travel corporation. Then the travel corporation could offer free Internet access over the whole vacation period. This offer could be a "flat rate" such that the customer pays a fixed amount say 50 € and does not need to care for the roaming costs etc. with the various mobile communication provider/s in the country/s the customer is travelling. The roaming costs would be charged to the travel corporation, instead.

It is to be understood that the proposed method and apparatus may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Optionally, the proposed method and apparatus is implemented as a combination of hardware and software. Moreover, the software may be implemented as an application program tangibly embodied on a program storage device. The application program may be uploaded to, and executed by, a machine comprising any suitable architecture. Optionally, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It should be understood that the elements shown in the figures may be implemented in various forms of hardware, software or combinations thereof. Optionally, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

It is to be further understood that, because some of the constituent system components and method operations depicted in the accompanying figures may be implemented in software, the actual connections between the system components (or the process operations) may differ depending on the manner in which the proposed method and apparatus is programmed. Given the teachings herein, one of ordinary skill in the related art will be able to contemplate these and similar implementations or configurations of the proposed method and apparatus.

The disclosure is not restricted to the exemplary embodiments described here. There is scope for many different adaptations and developments which are also considered to belong to the disclosure.

REFERENCE SIGN LIST

10 User Equipment
100 Bus
110 On-Board Communication Module
MC Mobile Communication Provider
BC Bus Transportation Company
CR1 Contract Relationship to Bus Company
CR2 Contract Relationship to Mobile Communication Company
CR3 Contract Relationship between Bus Company and Mobile Communication Company
DL Data Link
①-⑧ Different Operations of Information Exchange

The invention claimed is:

1. A non-transitory computer readable medium including a computer program comprising program operations, which when run in a computer carry out method operations on a customer's user equipment comprising:
   generating and sending by the customer's user equipment, a request message to a landing page of a mobile communication service provider to obtain Internet access for the customer's user equipment, wherein the request message includes at least one of a customer telephone number, customer contract information, data access conditions identifying an amount of covered data or time span in which data loading at the expense of the service provider is covered, and a speed at which data loading is covered;
   querying the customer's user equipment to determine whether the customer agrees to an intermediate change of a mobile communication contract, and maintaining current communications flow path between the customer's user equipment and the mobile communication service provider upon customer agreement to the intermediate change; and
   in response to a successful intermediate change of the mobile communication contract, receiving a confirmation message at the customer's user equipment from the mobile communication service provider indicating recording of the intermediate change of the mobile communication contract to inform the customer that costs for loading Internet data on the customer's user equipment are temporarily charged to the service provider instead of the customer.

2. The method of claim 1, further comprising performing position tracking of the customer's user equipment.

3. The method of claim 1, wherein the customer's user equipment comprises one of a smart phone, a tablet computer or notebook, or a laptop computer.

4. A method for providing Internet access to a customer of a service provider, wherein the service includes offering Internet access communication at the service provider's expenses, the method comprising:
the customer's user equipment generating a service start notification message to a server of the service provider for getting Internet access;
receiving, by a server of the service provider, the service start notification message;
the service provider server sending a query to a database containing customer data of the service provider; and
in response to a determination that the customer has access rights for getting Internet access at the service provider's expense, the service provider generating and sending a request message to the mobile communication provider of the customer and requesting an intermediate change of the customer's mobile communication contract so costs for loading Internet data on the customer's user equipment are temporarily charged to the service provider instead of to the customer,
wherein the intermediate change of the communication contract is recorded in the mobile communication provider's database.

5. The method of claim 4, wherein the customer is queried before the request is made whether the customer agrees to a temporary change of their mobile communication contract.

6. The method of claim 4, wherein the customer's user equipment performs a position tracking operation and the service start notification message is generated in response to the position tracking operation recognizing that the customer has reached a location where the service will be provided.

7. The method of claim 4, wherein the request message to the mobile communication provider of the customer includes at least one of a customer telephone number, customer contract information, data access conditions identifying an amount of covered data or time span in which data loading at the expense of the service provider is covered and a speed at which data loading is covered.

8. The method of claim 4, wherein checking whether the customer has access rights for getting Internet access at the service provider's expense includes authentication of the customer.

9. The method of claim 8, wherein authentication of the customer includes checking login data the customer entered.

10. The method of claim 4, wherein the mobile communication provider generates and sends a first confirmation message to the customer to inform them that their mobile communication contract has been changed.

11. The method of claim 4, wherein the service provider generates and sends a request message to the mobile communication provider of the customer for ending the intermediate change of the customer's mobile communication contract in response to position tracking recognizing that the customer has left the location where the service will be provided.

12. The method of claim 11, wherein the change back of the communication contract to personal contract conditions is recorded in the mobile communication provider's database, and wherein the mobile communication provider generates and sends a second confirmation message to the customer to inform him that his mobile communication contract has been changed back to the previous contract conditions.

13. The method of claim 4, wherein the first and second confirmation messages are generated and sent out as one of an SMS message corresponding to the Short Message Service, an EMMS message corresponding to Enhanced Message Service, and an MMS message corresponding to Multimedia Messaging Service.

14. The method of claim 4, wherein the customer's user equipment comprises one of a smart phone, a tablet computer or notebook, or a laptop computer.

15. The method of claim 4, wherein the customer's user equipment includes a mobile communication module which performs mobile communication according to one of Long Term Evolution or 5th Generation mobile communication technology.

16. The method of claim 4, wherein the service provider is one of a ridesharing service provider, a hotel service provider, a supermarket service provider, a warehouse service provider, a repair shop service provider, a public viewing service provider, or a transporting service provider, such as railway service provider, airline service provider or rental car service provider.

17. The method of claim 16, wherein the ridesharing service provider tracks the movement of the customer and verifies if the customer is travelling along a booked route of the ridesharing service, wherein charging of the costs to the ridesharing service provider for loading Internet data continues as long as the customer is travelling along the booked route.

* * * * *